(12) United States Patent
Smith et al.

(10) Patent No.: US 6,896,807 B1
(45) Date of Patent: May 24, 2005

(54) CAPACITOR ELECTROLYTE RECOVERY

(75) Inventors: W. Novis Smith, Philadelphia, PA (US); Terry Adams, Anaheim, CA (US)

(73) Assignee: Toxco Inc, Anaheim, CA (US)

( * ) Notice: Subject to any disclaimer, the term of this patent is extended or adjusted under 35 U.S.C. 154(b) by 214 days.

(21) Appl. No.: 10/375,254

(22) Filed: Feb. 27, 2003

(51) Int. Cl.$^7$ .............................................. B01D 11/02

(52) U.S. Cl. ................ 210/634; 23/299; 23/303; 203/48; 210/772; 210/774; 210/806; 241/21; 241/23; 361/502; 361/505

(58) Field of Search ................... 23/295 R, 299, 23/303; 203/47, 48; 210/634, 639, 767, 768, 210/772, 774, 806; 241/21, 23; 361/502–505, 361/508

(56) References Cited

U.S. PATENT DOCUMENTS

| | | | | |
|---|---|---|---|---|
| 4,215,385 A | * | 7/1980 | Behn et al. | 361/273 |
| 6,089,479 A | * | 7/2000 | Chang et al. | 241/17 |
| 6,096,185 A | * | 8/2000 | Corlett et al. | 205/742 |
| 6,164,571 A | * | 12/2000 | Kovalak et al. | 241/16 |
| 6,356,433 B1 | * | 3/2002 | Shi et al. | 361/502 |

* cited by examiner

Primary Examiner—Joseph Drodge
(74) Attorney, Agent, or Firm—John Lezdey & Assoc.

(57) ABSTRACT

A method for recovering and recycling expensive and hazardous components from capacitors containing an electrolyte salt dissolved in an aprotic organic solvent. The method includes disintegrating a plurality of capacitor casings and their contents into fragments and forming an aqueous slurry of water insoluble fragments, filtering fractionally distilling the filtrate to remove the solvent as a distillate and recovering the electrolyte salt.

19 Claims, 1 Drawing Sheet

CAPACITOR ELECTROLYTE RECOVERY

FIELD OF THE INVENTION

The invention relates to the recovery of expensive and environmentally hazardous components from discarded electrolyte capacitors, particularly super-capacitors and DLC (double layer capacitors).

DESCRIPTION OF THE PRIOR ART

As more electronic equipment circuits have become digitalized small capacitors having low impedance in a high frequency range and with large capacity are increasingly required. Such capacitors referred to as super capacitors or DLCs usually comprise a capacitor element consisting of a plurality of carbon or valve-metal electrodes, separated by a spacer sheet impregnated by an electrolyte system comprising a stable conducting organic salt as a solute dissolved in a stable aprotic organic solvent encased in an outer housing structure of a suitable construction known to the art, including metal.

A typical known class of super capacitors comprises an aluminum foil anode having one oxide coated surface wound with an untreated aluminum foil cathode, interleaved with a porous spacer made of paper impregnated by an electrolyte comprising a quaternary ammonium salt of an aliphatic saturated carbokylic acid and its derivations or tetrafluoroborate dissolved in an alkyl nitrile, such as acetonitrile or cyclic organic carbonates or blends. Another type of super capacitor contains carbon coated electrodes also containing quaternary ammonium salts.

A specific super capacitor comprises an aluminum foil coated with carbon having a dielectric spacer of kraft paper immersed in an electrolyte system of tetraethylammonium tetrafluoroborate dissolved in acetonitrile. This super capacitor achieves unique electrical operational characteristics and is most apparent in the operation of electronic equipment at low temperatures, that is temperatures of –50 to – 60° C. and in miniature devices of high capacities that are desired for use in low voltage applications as for transistor circuitry. Larger versions of these same capacitors are being used in the automotive areas.

However, acetonitrile is a hazardous material, it is not only toxic but in mixtures with air it may become flammable or explosive. Furthermore, it is water soluble as is the electrolyte salt, for example, a tetraalkylammonium salt such as tetraethylammonium tetrafluoroborate. Careful measures must be taken with attendant handling to avoid health hazards, spillage, and to prevent these materials from entering the ground water and aquifers.

These super capacitors are produced currently on a large industrial scale and it is projected that the demand for these capacitors will increase exponentially in the near future. This large volume raises several issues when these capacitors are no longer useful and are to be disposed of. Not only are the electrolyte components hazardous and toxic on handling but are also a potential threat to the environment.

U.S. Pat. Nos. 6,356,433; 5,591,318; and 5,637,421, which are herein incorporated by reference relate to capacitors which can be used in the present invention.

Therefore, there exists a need for a safe, efficient and economical method for the recovery and recycling of costly capacitor components and the proper disposal of the contained substances that are neither hazardous to health nor harmful to the environment.

SUMMARY OF THE INVENTION

According to this invention there is provided a process for recovering components of discarded electrolyte capacitors or DLCs for recycling. The basic capacitor structure is comprised of at least two foils of a valve action metal such as aluminum that are wound about one another and separated by a porous dielectric spacer or separator made of insoluble nonmetallic material such as paper, plastic inter alia which is impregnated with an electrolyte system usually consisting of a conductive soluble electrolyte salt typically a quaternary ammonium salt dissolved in an aprotic high dielectric solvent, for example alkyl nitrites having 2 to 5 carbon atoms and dinitriles, and alkyl or cyclic organic carbonates all encased within a metal container, such as aluminum.

Broadly, the method for recovering components from the capacitors described above involves an integrated process comprising: disintegrating a plurality of capacitor casings and their contents into fragments in a water medium optionally precooled or frozen with a cryogenic fluid and forming an aqueous slurry of water insoluble fragments, i.e., skimming off the floating non-metallic components from the aqueous slurry, transferring the filtered aqueous medium to a distilling column to separate and recover the solvent as the distillate and to form an aqueous bottoms slurry of water and possibly some insolubles; optionally the metal fragments from the aqueous filtration are reduced to smaller particles to further expose and extract the water soluble salts, and separating this aqueous wash from the denser metal particles from the bottom slurry; filtering the aqueous mixture of insoluble nonmetallic particles to form a filter cake; washing the filter cake free of salt and releasing the filter cake for safe disposal; recirculating the resulting filtrate containing the water soluble electrolyte salt until the salt content reaches concentration for efficient recovery of the salt, i.e., about 10 to 40 weight percent of the filtrate; treating the filtrate in a stripping/distillation unit to separate and recover the electrolyte salt of about 30 to 70 weight percent and treating the salt solution in a crystallizer unit to separate the solid salt from the mother liquor; cooling the salt and recirculating or safely disposing the mother liquor. Optionally, the metallic components may be cryovaced to facilitate particalizing.

In a preferred embodiment of the present invention the operative electrolyte system is a combination of tetraethylammonium tetrafluoroborate dissolved in high dielectric solvent at between about 10 to 35 weight percent concentration with aluminum foil as electrodes and aluminum casings. The method comprising the steps of:

(a) disintegrating a plurality of dispersed capacitors in a water medium to form an aqueous slurry of aluminum fragments and insoluble nonmetallic fragments in an aqueous solution containing a water soluble electrolyte of tetraethylammonium tetrafluoroborate dissolved in the high dielectric solvent;

(b) separating the aqueous solution from the insoluble pieces;

(c) treating the aqueous solution in at least one distillation step using a distilling column to separate and recover the solvent from the aqueous slurry and producing a bottom slurry consisting of an aqueous solution of tetraethylammonium tetrafluoroborate;

(d) optionally pulverizing the non-floating metallic pieces from (b) to reduce the size of insoluble fragments to form smaller insoluble particles and washing;

(e) washing and filtering the non-metallics from (a) to form a disposable non-metallic cake and a diluted solution wash of salt;

(f) treating the combined wash and aqueous bottom slurry to a predetermined concentration in a stripping/distillation column to separate and recover any residual solvent and to obtain a concentrate of the aqueous solution of tetraethylammonium tetrafluoroborate; optionally a filtrate having a concentration less than the predetermined concentration is recirculated in a controlled flow to the process vessel so that the concentration can be increases before treatment in a stripping/distillation column;

(g) treating the concentrated solution of tetraethylammonium tetrafluoroborate in a crystallization unit to separate a solid tetraethylamonium tetrafluoroborate and to obtain a mother liquor; and (h) recovering tetraethylammonium tetrafluoroborate and either recirculating the mother liquor to the process vessel in step (a) or safely disposing in a manner not detrimental to the environment.

All the aqueous solutions and aqueous slurries formed or used in the process of the present invention should have a pH of about 7 by adding the required small amount of fluoroboric acid or a base, for example, lime or tetraethylammonium hydroxide.

By the preferred method of this invention a solvent such as acetonitrile and an ionic salt such as tetraethylammonium tetrafluoroborate can be recovered substantially free of contaminants and utilized in the production of high performance capacitors and in related uses. Contaminants include the insoluble nonmetallic materials (paper and plastic) generally used in the manufacture of capacitors, for example, super capacitors, as well as, impurities formed as a result of capacitor failure during use. For example, by the application of excess current through the capacitor, organic decomposition products, which include water insoluble organic compounds that are generated. The concentration and purity of acetonitrile or solvent recovered according to the invention is suitable for new production. The acetonitrile solvent forms an integral part of the electrolyte combination of the many super capacitors and may be used up to about 80 weight percent based on the total weight of the electrolyte. Likewise, the electrolytic salt can be recovered and reused in such manufacture. The electrolyte salt components are expensive chemicals and their recycling reduces overall production costs of new capacitors. Obviously such reuse avoids disposal problems which would be detrimental to the environment.

Similarly other types of capacitors using organic aprotic solvents such as propylene carbonate and other ionic salts may be similarly recovered.

It is a primary object of the present invention to provide a safe, economical and efficient method for recovering expensive and hazardous capacitor components for reuse in electronic device manufacture thereby avoiding waste disposal problems.

Another object of the present invention is to provide a method to recover the electrolyte solvents, especially alkyl nitrites from disposed capacitors substantially free of solid materials of the electrolyte salt component and of sufficient purity to be used in the manufacture of other capacitors and in similar electronic applications.

A further object of the present invention is to provide a method for recovering acetonitrile from disposed super capacitors with a reduced hazard of explosion or fire from mixtures with air or oxygen.

Yet another object of the present invention is to provide a method to recover and reuse soluble electrolyte salts which are substantially free of solid and liquid impurities and suitable for reuse in the manufacture of electronic equipment.

It is still a further object of the invention object of the invention to provide a method to recover and recycle tetraethylammonium tetrafluoroborate and related salts from disposed super capacitors and releasing disposal substances not detrimental to the environment.

Additional objects, advantages and novel features of the invention will be set forth in part in the description that follows and in part will become apparent to those skilled in the art upon examination of the following or that which may be taught by the practice of the invention.

DETAILED DESCRIPTION OF THE PREFERRED EMBODIMENTS

Figure 1:
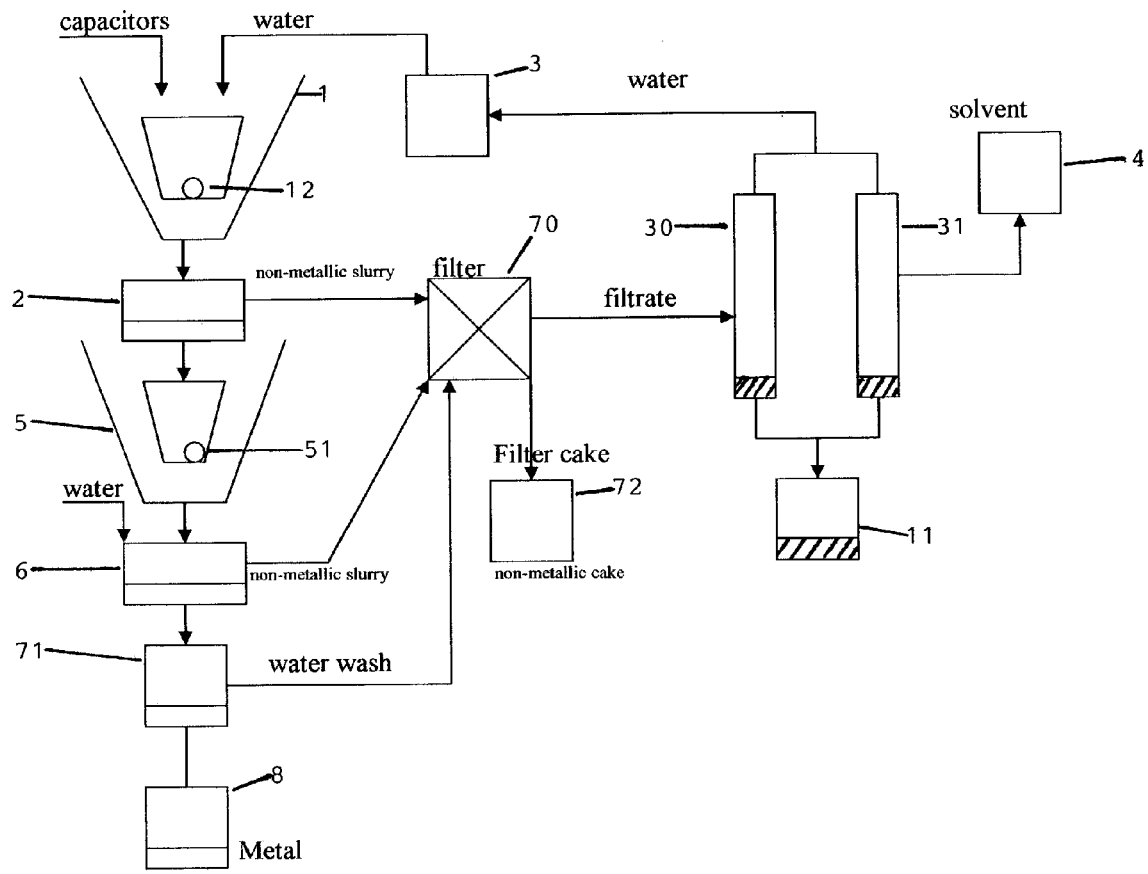
FIG. 1 is a schematic diagram of the process for the recovery of environmentally hazardous components from discarded super capacitors for reuse in capacitor manufacture.

Referring to FIG. 1 there is illustrated a process flow diagram of an embodiment of the present invention, which provides for the recovery and reuse of environmentally damaging materials especially of a stable aprotic polar solvent particularly nitrites such as acetonitrile and/or alkyl carbonates and an organic electrolyte solute including quaternary ammonium salts and specifically tetraethylammonium tetrafluoroborate which form integral parts of the electrolyte combination useful in the production of super capacitors (double layer capacitors). The structure of the high performance double layer or super capacitors comprises two layers (an anode foil and a cathode foil) of carbon coated aluminum as the cathode wound about another aluminum foil having an oxide film on one surface facing the cathode through a separator positioned between the anode and cathode foils. The separator is impregnated with the electrolyte combination referred to above, and all the components encased in an outer housing of aluminum or other metals. Alternative construction of cathodes and anodes involves carbon fibers and powders.

A plurality of disposed capacitors are introduced into a disintegration unit 1 containing disintegrating means 12 such as a hammer mill shredder for reducing the capacitors into fragments. Typically the disintegrating means is in the form of rotating hammers, routing discs or a grinding wheel which may be rotated by a conventional electric AC or DC motor (not shown) having a suitable speed control. The disintegrating means 12 is intended to destroy the unity or integrity of the capacitors innerhousing and to expose and release the contents for treatment. This breaching operation may also be accomplished by crushing, grinding, or shearing. However, during this break-up operation the formation of explosive or flammable nitrile, especially alkyl nitrile vapors must be avoided. Therefore, the disintegration step must be conducted preferably in a closed vessel to eliminate air or oxygen or an inert atmosphere to avoid formation of an explosive mixture. Several precautionary approaches must be taken which may include optionally conducting the disintegration step by freezing the used capacitors with a refrigerant such as liquid nitrogen prior to and during the disintegration step.

In accordance with one embodiment of this invention, water is introduced into the closed disintegration unit 1 to cover the plurality of capacitors previously charged to quench any formation of solvent vapors and to leach out the salt and solvents from the disintegrated casing. The crushing or grinding produces an aqueous slurry of insoluble aluminum fragments (from the electrode foils and casing) and other metals if present and insoluble nonmetallic fragments (from paper and plastics) and insoluble nonmetallic decomposition products (carbon, graphite, and organic compounds) slurried in an aqueous solution containing solvent and the electrolyte salt such as tetraethylammonium tetrafluoroborate. The aqueous lower slurry containing the mostly metallic insoluble fragments is transferred to a holding tank 2. In the embodiment shown, the upper slurry is filtered and fractionally distilled in stages in a plurality of distillation columns 30 and 31. However, in some cases a single distillation column may be employed. Since the solvent, for example, acetonitrile has a higher vapor pressure than the salt solution, it passes overhead as the distillate stream to the storage recovery tank 4. The condensate passes back to the still bottom and is utilized for solubilizing the electrolyte salt and forming a solution. This solution mixes with the remaining salt to form an aqueous slurry at still bottoms.

Optionally, the aqueous slurry of tank 2 is passed to a pulverizer 5 having a pulverizing means, for example, in the form of a shredding or grinding wheel 51 to reduce the size of the insoluble fragments into smaller aluminum particles and insoluble particles to less than one-half inch. Further, the pulverizing action exposes any remaining electrolyte salt still clinging to the other components. The reduction in particle size also allows an easier separation of the aluminum particles from the nonmetallic particles. The aqueous slurry having the reduced-in-size particles is passed to process vessel 6. Process vessel 6 serves to allow the tetraethylammonium tetrafluoroborate containing the aqueous slurry to settle as a systems reservoir for recirculating various process streams. The overflow from the settled slurry is passed to filter 70 to produce a clear aqueous solution of tetrafluoroborate. The remaining metal particle residue in the vessel 6 are washed in fresh water, are recovered from vessel 71, dried and stored in metal storage 8. Metal storage 8 may be equipped with a heater to accelerate drying. The additional amount of water used in washing is added to the combined filtrate stream to suspend the insoluble nonmetallic particles. All filtrates and washes are fed to the distillation concentrator 30, 31. The non-metallic filter cake free of salt and solvent is removed to vessel 72 for disposal which is not detrimental to the environment. The filtrate is passed to a stripper/distillation column 30 to 31 to remove any remnants of solvent and other volatiles if present. The organic solvent is first removed at the top of the column and passed to storage tank 4. The solution is then concentrated by removing water to tank 3. At a concentration of about 30 to 70 weight percent, the hot electrolyte salt solution is passed to a crystallizer 11. Optionally a vacuum may be applied to the concentration in the crystallizer 11. Another technique would add a chiller (not shown) to reduce the temperature quickly to about 0° C. to accelerate the crystallization.

If the tetraethylammonium tetrafluoroborate solution after the stripping/distilling step has a color, a decolorizing carbon treatment may be used prior to the crystallization step. Such decolorization techniques are well known to those skilled in the art.

In this specification and in the claims which follow, reference is made to a number of terms which are defined as follows:

The terms "valve action metal" or "valve metal" refers to metals that form oxides naturally and which may be thickened by anodic oxidation. Such metals include aluminum, bismuth, columbium, magnesium, niobium, silicon, titanium, tantalum, ruthenium, zirconium and alloys thereof.

Nitriles refer to mononitriles and dinitriles.

The terms "alkyl nitrites" or "lower alkyl nitrites" as used herein refers to an alkyl group having 2 to 6 carbon atoms such as acetonitrile, propionitrile and butyronitrile. The term dinitriles refer to succinonitrile, glutaronitrile and the like.

The term "quaternary ammonium salt of an aliphatic saturated carboxylic acid" refers to mono- and di-carboxylic acid having 6 to 10 carbon atoms.

Organic carbonate solvents include ethylene carbonate, ethylene carbonate having a five membered ring, propylene carbonate and dimethyl carbonate.

The term "fractional distillation" refers to the process step in which a part of the vapor is condensed liquid that concurrently contacts the forming vapor stream.

Electrolyte salts include tetraalkylammonium salts such as tetraethylammonium tetrafluoroborate, methyltriethylammonium tetrafluoroborate, the triflate and hexafluorophosphate, imidazolium salts such as 1-ethyl-3-methylimidazolium tetrafluoroborate ($EMIBF_4$), triflate or hexafluorophosphate and the like.

It will now be apparent to those skilled in the art that other embodiments, improvements, details, and uses can be made consistent with the letter and spirit of the foregoing disclosure and within the scope of this patent which is limited only by the following claims, construed in accordance with the patent status including the doctrine of equivalents.

What is claimed is:

1. A method for the recovery of components of disposed capacitors for recycling, said components include insoluble metallic and nonmetallic materials impregnated with an electrolyte system composed of an electrolyte salt dissolved in an aprotic dielectric solvent, all the components being encased within an outer housing structure of metal, said method comprising the steps of:
   (a) disintegrating a plurality of said capacitors and forming an aqueous slurry of insoluble metal fragments containing an electrolyte salt and a solvent;
   (b) separating the metal components from the aqueous slurry;
   (c) filtering the slurry from step (b) to form a filter cake of non-metallic particles and an aqueous filtrate containing electrolyte salts;
   (d) treating the filtrate from step (c) in a stripping/distillation apparatus to separate and recover residual solvent and to yield a concentrated solution of an electrolyte salt; and then
   (e) crystallizing and separating the electrolyte salt.

2. The method of claim 1 including the steps of reducing the particle size of the metal components from step (b) and washing the particles to obtain a solution of any residual electrolyte salts or solvent.

3. The method of claim 2 including the step of adding the solution obtained to a stripping/distilling apparatus.

4. The method of claim 1 including the steps of washing the filter cake from step (c) to obtain a solution of any residual electrolyte salts or solvent and adding said solution to the stripping/distillation apparatus.

5. The method of claim 1 wherein said metallic material is selected from the group of aluminum, bismuth, magnesium, niobium, silicon, titanium, tantalum, zirconium and alloys thereof.

6. The method of claim 1 wherein said insoluble nonmetallic material comprises dielectric substances.

7. The method of claim 6 wherein the electrolyte salt comprises quaternary tetraethylammonium tetrafluoroborate.

8. The method of claim 6 wherein said dielectric substances are selected from the group consisting of plastics, paper, and mixtures thereof.

9. The method of claim 1 wherein a cryogenic liquid is used to freeze the capacitors prior to disintegrating.

10. The method of claim 1 wherein said electrolyte salt is selected from the group consisting of a quaternary ammonium salt of an aliphatic saturated carboxylic acid having 10 to 20 carbon atoms and quaternary tetraalkyl ammonium tetrafluoroborate, and EMI $BF_4$.

11. The method of claim 1 wherein said solvent is an alkyl nitrile having 2 to 5 carbon atoms.

12. The method of claim 11 wherein said alkyl nitrile is acetonitrile.

13. The method of claim 11 further comprising adjustment of the pH of the slurry by the addition of fluoroboric acid or a base.

14. The method of claim 1 wherein said electrolyte system comprising tetraethylammonium tetrafluoroborate dissolved in acetonitrile.

15. The method of claim 1 wherein step (d) comprises fractional distillation conducted in stages.

16. The method of claim 1 wherein the pH of the aqueous slurry is adjusted to 7.

17. The method of claim 1 wherein the aqueous filtrate of step (c) is repeatedly filtered until the electrolyte salt reaches a concentration level of between at least about 10 to 40% by weight prior to distillation.

18. The method of claim 14 wherein the concentration of the electrolyte salt in step (c) is between about 30 to 70 weight percent.

19. A method of recovering the electrolyte salt and solvent from a capacitor which comprises the steps of:

(a) cooling the capacitor;

(b) disintegrating the capacitor in an aqueous system and forming an aqueous slurry;

(c) removing metal components from said slurry;

(d) filtering said slurry free of metal components to obtain a filtrate;

(e) fractionally distilling said filtrate to recover said solvent and to concentrate said filtrates; and (f) recrystallizing the electrolyte salt from said concentrated filtrate of step (e).

* * * * *